United States Patent
Hirata et al.

(10) Patent No.: US 11,938,916 B2
(45) Date of Patent: Mar. 26, 2024

(54) BRAKE CONTROL DEVICE

(71) Applicant: ADVICS CO., LTD., Kariya (JP)

(72) Inventors: Masahiro Hirata, Kariya (JP);
Terushige Uraoka, Kariya (JP);
Hirotaka Takeya, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 17/783,218

(22) PCT Filed: Dec. 23, 2020

(86) PCT No.: PCT/JP2020/048265
§ 371 (c)(1),
(2) Date: Jun. 7, 2022

(87) PCT Pub. No.: WO2021/132386
PCT Pub. Date: Jul. 1, 2021

(65) Prior Publication Data
US 2023/0020123 A1    Jan. 19, 2023

(30) Foreign Application Priority Data
Dec. 24, 2019    (JP) .................................. 2019-232331

(51) Int. Cl.
*B60T 8/88*    (2006.01)
*B60T 17/18*    (2006.01)

(52) U.S. Cl.
CPC .............. *B60T 8/885* (2013.01); *B60T 17/18* (2013.01); *B60T 2201/06* (2013.01); *B60T 2240/06* (2013.01); *B60T 2270/40* (2013.01)

(58) Field of Classification Search
CPC ..................................................... B60T 8/885
(Continued)

(56) References Cited

U.S. PATENT DOCUMENTS

| 7,762,633 B2 * | 7/2010 | Maskell | ................... B60T 8/245 303/192 |
| 11,447,133 B2 * | 9/2022 | Haerdtl | .................... F16H 59/54 |
| 2010/0004095 A1 * | 1/2010 | Sokoll | ..................... B60T 7/122 477/198 |

FOREIGN PATENT DOCUMENTS

| DE | 102017205892 A1 * | 10/2018 | ............ B60T 13/662 |
| JP | 2013071643 A | 4/2013 | |

(Continued)

OTHER PUBLICATIONS

International Search Report (PCT/ISA/210) with translation and Written Opinion (PCT/ISA/237) dated Feb. 2, 2021, by the Japanese Patent Office as the International Searching Authority for International Application No. PCT/JP2020/048265.

*Primary Examiner* — Derek D Knight
(74) *Attorney, Agent, or Firm* — BUCHANAN INGERSOLL & ROONEY PC

(57) ABSTRACT

A brake control device as an example of the present disclosure includes: an acquisition unit configured to acquire an output of a sensor that detects information indicating a ground contact state of a drive wheel of a vehicle; and a control unit configured to, when an acceleration operation for causing the vehicle to accelerate is performed on the vehicle stopped due to a parking brake force generated by an electric parking brake, identify the ground contact state of the drive wheel based on the output of the sensor acquired by the acquisition unit, and control the electric parking brake to release the parking brake force by a control method that differs depending on the identified ground contact state.

8 Claims, 5 Drawing Sheets

(58) Field of Classification Search
USPC .................................. 477/186–187, 194–198
See application file for complete search history.

(56) References Cited

FOREIGN PATENT DOCUMENTS

| | | | |
|---|---|---|---|
| JP | 2015536270 A | 12/2015 | |
| WO | 2014060295 A1 | 4/2014 | |

\* cited by examiner

BRAKE CONTROL DEVICE

TECHNICAL FIELD

The present disclosure relates to a brake control device.

BACKGROUND ART

In the related art, a technique referred to as a drive away release (DAR) or the like is known in which, when a vehicle is stopped due to a parking brake force generated by an electric parking brake, the parking brake force is released in response to an acceleration operation for causing the vehicle to accelerate. In such a technique in the related art, on a premise that all drive wheels of the vehicle are in contact with the ground, it is common to start release of the parking brake force by using, as a trigger, a drive force generated by a drive source of the vehicle in response to the acceleration operation exceeding a predetermined threshold value.

CITATION LIST

Patent Literature

PTL 1: JP-A-2015-536270

SUMMARY

Technical Problem

However, for example, it is also assumed that a vehicle is stopped due to a parking brake force in a state where at least one wheel is not in contact with the ground on a predetermined road surface such as an uphill road having a large unevenness. Here, when a lifted wheel that is not in contact with the ground is a drive wheel and the parking brake force is released by the general DAR described above, an actual drive force that compensates for a decrease in the parking brake force is not transmitted to a road surface, and an unintended behavior of the vehicle, such as sliding down on the uphill road, may occur.

An object of the present disclosure is to provide a brake control device capable of preventing an unintended behavior of a vehicle that may occur when a parking brake force is released in response to an acceleration operation.

Solution to Problem

A brake control device as an example of the present disclosure includes: an acquisition unit configured to acquire an output of a sensor that detects information indicating a ground contact state of a drive wheel of a vehicle; and a control unit configured to, when an acceleration operation for causing the vehicle to accelerate is performed on the vehicle stopped due to a parking brake force generated by an electric parking brake, identify the ground contact state of the drive wheel based on the output of the sensor acquired by the acquisition unit, and control the electric parking brake to release the parking brake force by a control method that differs depending on the identified ground contact state.

According to the brake control device described above, when the parking brake force is released in response to the acceleration operation, the ground contact state of the drive wheel is taken into consideration. Therefore, it is possible to prevent unintended behavior of the vehicle that may occur when the parking brake force is released in response to the acceleration operation.

DESCRIPTION OF EMBODIMENTS

Hereinafter, embodiments and modifications disclosed in the present disclosure will be described with reference to the drawings. Configurations of the embodiments and the modifications described below and actions and effects provided by the configurations are merely examples, and are not limited to the following description.

Embodiment

Figure 1:
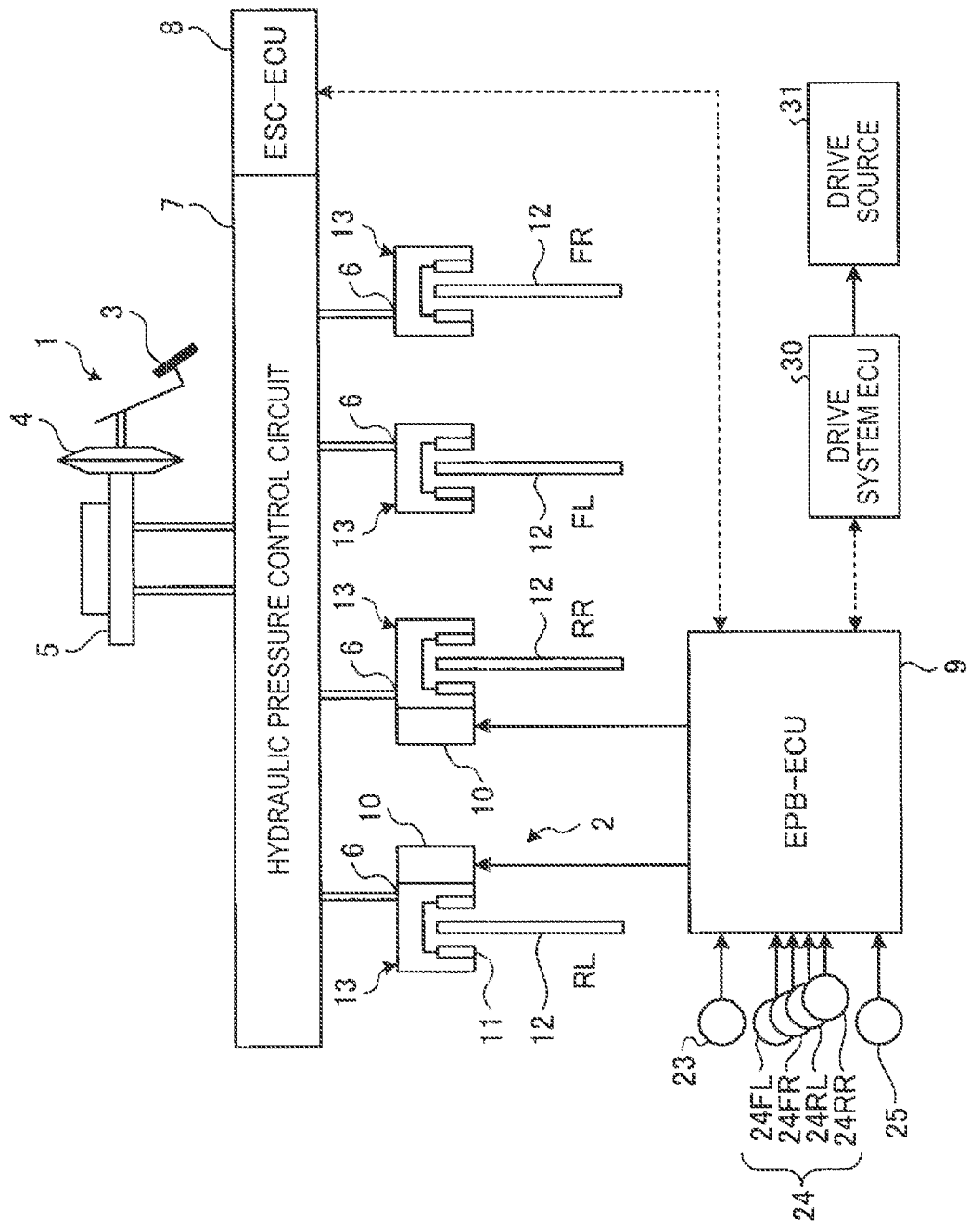
FIG. 1 is an exemplary and schematic block diagram illustrating a schematic configuration of a vehicle according to an embodiment.

FIG. 1 is an exemplary and schematic block diagram illustrating a schematic configuration of a vehicle according to an embodiment. In the following description, as an example, an example in which a technique of the embodiment is applied to a vehicle as a four-wheel automobile including front wheels FL and FR and rear wheels RL and RR will be described. In the following description, when it is not necessary to distinguish the wheels from one another, the front wheels FL and FR and the rear wheels RL and RR may be collectively referred to as wheels.

As illustrated in FIG. 1, the vehicle according to the embodiment includes two types of brake devices (brake force applying units) of a regular brake 1 that generates a brake force in response to a depression operation of a brake pedal 3 by a driver, and an electric parking brake 2 that generates a brake force by EPB motors 10 separately from the regular brake 1. The electric parking brake may also be referred to as an EPB. Hereinafter, when it is necessary to distinguish the brake forces from each other, the brake force generated by the regular brake 1 may be referred to as a regular brake force, and the brake force generated by the electric parking brake 2 may be referred to as a parking brake force.

In the example illustrated in FIG. 1, the regular brake 1 is configured to apply the brake force to all the wheels of the front wheels FL and FR and the rear wheels RL and RR, and the electric parking brake 2 is configured to apply the brake force to only the rear wheels RL and RR. As will be described in detail later, both the regular brake 1 and the electric parking brake 2 are configured to apply the brake force based on a frictional force to the wheels by pressing brake pads 11 against brake discs 12 that rotate together with the wheels.

FIG. 1 illustrates, as an example, a configuration in which the electric parking brake 2 applies the brake force to only the rear wheels RL and RR, but the technique of the embodiment is also applicable to a configuration in which the electric parking brake 2 applies the brake force to only the front wheels FL and FR, and is also applicable to a configuration in which the electric parking brake 2 applies the brake force to all the wheels.

The regular brake 1 includes a master cylinder 5 that generates a pressure (hydraulic pressure) based on a brake operation such as a depression of the brake pedal 3 by the driver, and a brake booster 4 that amplifies a force in the brake operation. The regular brake 1 applies the brake force generated by the hydraulic pressure to the wheels by transmitting the hydraulic pressure in the master cylinder 5 corresponding to a depression force on the brake pedal 3 amplified by the brake booster 4 to wheel cylinders 6 provided on the respective wheels.

Here, in the example illustrated in FIG. 1, a hydraulic pressure control circuit 7 is provided between the master cylinder 5 and the wheel cylinders 6. The hydraulic pressure control circuit 7 includes an electromagnetic valve, a pump, and the like, and is provided to implement control called electronic stability control (ESC) or the like for improving safety of a vehicle, such as an adjustment according to a situation of a brake force generated by the regular brake 1. The hydraulic pressure control circuit 7 is driven under control of an ESC-ECU (electronic control unit) 8.

On the other hand, the electric parking brake 2 applies the brake force separately from the brake force generated by the regular brake 1 to the front wheels FL and FR by driving the EPB motors 10 as electric actuators provided in calipers 13 based on control of an EPB-ECU 9. Therefore, in the embodiment in which the EPB motors 10 are respectively provided on the rear wheels RL and RR, as illustrated in FIG. 2 described later, both the regular brake force generated by the regular brake 1 and the parking brake force generated by the electric parking brake 2 can be applied to the rear wheels RL and RR.

Figure 2:
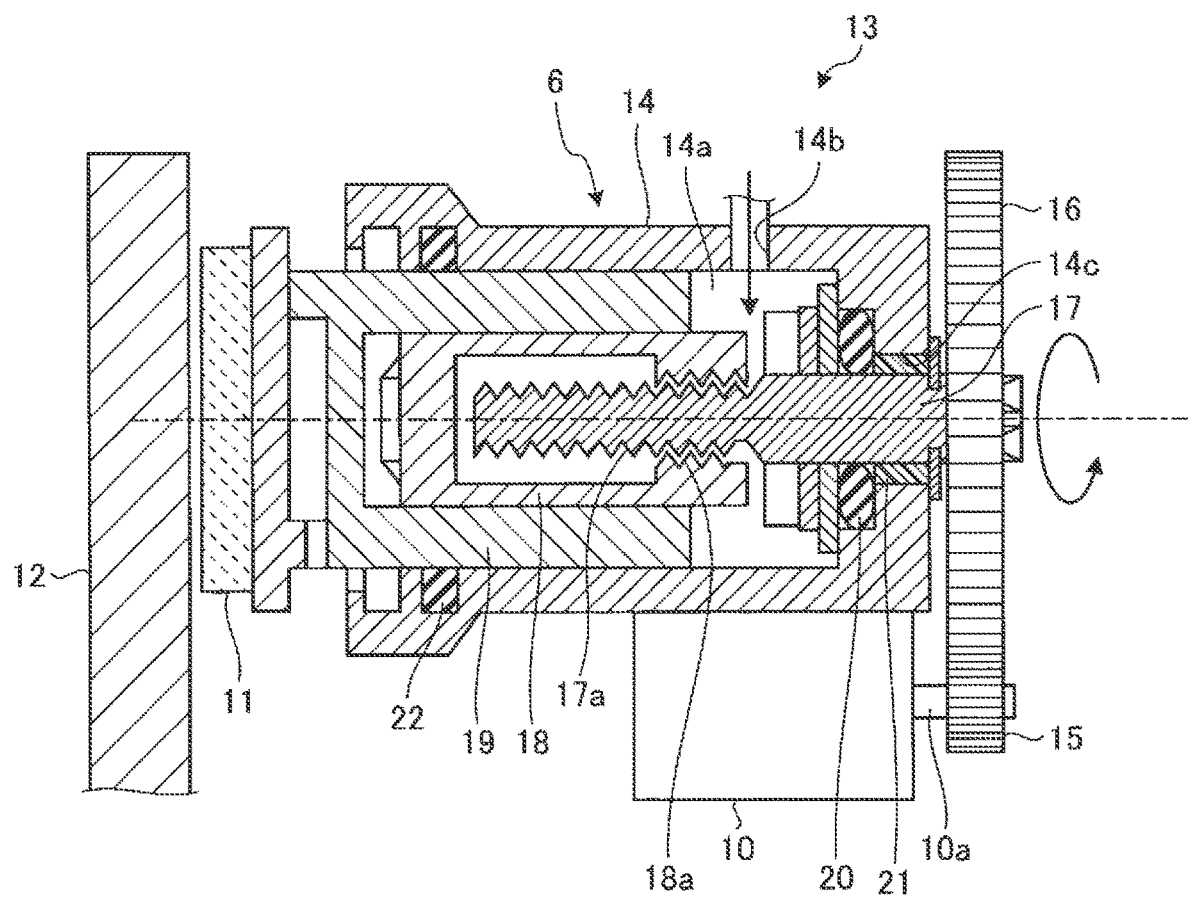
FIG. 2 is an exemplary and schematic cross-sectional view illustrating a configuration of a brake device provided in rear wheels of the vehicle according to the embodiment.

FIG. 2 is an exemplary and schematic cross-sectional view illustrating a configuration of the brake device provided on the rear wheels RL and RR of the vehicle according to the embodiment. FIG. 2 illustrates a specific example of structures in the calipers 13 of the rear wheels RL and RR.

A mechanism of increasing or decreasing the regular brake force generated by the regular brake 1 is as follows.

As illustrated in FIG. 2, in the embodiment, a body 14 of the wheel cylinder 6 is provided with a hole portion 14b through which a brake fluid is introduced into a hollow portion 14a inside the body 14. The hollow portion 14a is provided with a piston 19 that can reciprocate along an inner peripheral surface of the body 14. The piston 19 is formed in a bottomed cylindrical shape, and a brake pad 11 facing the brake disc 12 is provided at a bottom portion of the piston 19.

A seal member 22 is provided inside the body 14 of the wheel cylinder 6 to prevent the brake fluid from leaking out of a space between an outer peripheral surface of the piston and the inner peripheral surface of the body 14. Accordingly, the hydraulic pressure generated in the hollow portion 14a is applied to an end surface of the piston 19 on a side opposite to the brake pad 11.

According to the above structure, when the depression operation of the brake pedal 3 is performed as an operation of the regular brake 1, the hydraulic pressure caused by the brake fluid is generated in the hollow portion 14a, and the piston 19 moves in a direction in which the brake pad 11 is pressed (a left direction of a paper surface in FIG. 2). When the piston 19 moves in the direction in which the brake pad 11 is pressed, the brake pad 11 comes into contact with and is pressed against the brake disc 12, and the regular brake force based on the frictional force is applied to a wheel corresponding to the brake disc 12.

Conversely, when an operation of releasing the depression of the brake pedal 3 is performed as an operation of the regular brake 1, the hydraulic pressure in the hollow portion 14a is reduced, and the piston 19 moves in a direction in which the pressing of the brake pad 11 is released (a right direction of the paper surface in FIG. 2). When the piston 19 moves in the direction in which the pressing of the brake pad 11 is released, a pressing force of the brake pad 11 against the brake disc 12 is weakened, and the brake force applied to the wheel corresponding to the brake disc 12 is reduced. When the brake pad 11 is completely separated from the brake disc 12, the regular brake force applied to the brake disc 12 becomes zero.

On the other hand, a mechanism of increasing or decreasing the parking brake force generated by the electric parking brake 2 is as follows.

As illustrated in FIG. 2, in the embodiment, the EPB motor 10 is fixed to the body 14 of the wheel cylinder 6. A spur gear 15 is connected to a drive shaft 10a of the EPB motor 10. Accordingly, when the EPB motor 10 is driven to rotate the drive shaft 10a, the spur gear 15 also rotates with the drive shaft 10a as a center of rotation.

A spur gear 16 including a rotation shaft 17 is meshed with the spur gear 15. The rotation shaft 17 is positioned at a center of rotation of the spur gear 16, and in a state of being inserted into an insertion hole 14c of the body 14 of the wheel cylinder 6, the rotation shaft 17 is supported by an O-ring 20 and a bearing 21 provided in the insertion hole 14c.

Here, a male screw groove 17a is formed on an outer peripheral surface of an end portion of the rotation shaft 17 on a side opposite to the spur gear 16. The male screw groove 17a is screwed into a female screw groove 18a provided on an inner peripheral surface of a bottomed cylindrical linear motion member 18 that reciprocates inside the piston 19. Accordingly, when the spur gear 15 is rotated by the driving of the EPB motor 10, the rotation shaft 17 rotates together with the spur gear 16, and the linear motion member 18 reciprocates in an axial direction of the rotation shaft 17 due to meshing between the male screw groove 17a and the female screw groove 18a.

Since the linear motion member 18 has an anti-rotation structure in relation to the rotation shaft 17, the linear motion member 18 does not rotate together with the rotation shaft 17 even when the rotation shaft 17 rotates. Similarly, since the piston 19 also has an anti-rotation structure in relation to the linear motion member 18, the piston 19 does not rotate together with the linear motion member 18 even if the linear motion member 18 rotates about the rotation shaft 17.

As described above, in the embodiment, a motion converting mechanism that converts the rotation of the EPB motor 10 into a reciprocating movement of the linear motion member 18 inside the piston 19 is provided. When the driving of the EPB motor 10 is stopped, the linear motion member 18 stops at the same position due to a frictional force caused by the meshing between the male screw groove 17a and the female screw groove 18a.

According to the above structure, when the EPB motor 10 rotates in a normal direction during operation of the electric parking brake 2, the linear motion member 18 moves in a direction (the left direction of the paper surface in FIG. 2) in which the linear motion member 18 comes into contact with the piston 19. When the linear motion member 18 and the piston 19 come into contact with each other in a state where the brake pad 11 is pressed against the brake disc 12, the piston 19 is supported by the linear motion member 18. Therefore, the parking brake force applied to the wheels is maintained (locked) as it is even when the depression of the brake pedal 3 (see FIG. 1) is released and the hydraulic pressure of the hollow portion 14a is reduced.

Conversely, when the EPB motor 10 rotates in a reverse direction, the linear motion member 18 moves in a direction away from the piston 19 (the right direction of the paper surface in FIG. 2). When the linear motion member 18 is separated from the piston 19, the pressing of the brake pad 11 to the brake disc 12 caused by the piston 19 is weakened accordingly, and the parking brake force applied to the wheels is gradually released.

As described above, in the embodiment, a mechanism for applying the brake force to the rear wheels RL and RR is partially shared by the regular brake 1 and the electric parking brake 2.

Returning to FIG. 1, the ESC-ECU 8 is configured as a microcomputer including, for example, a processor, a memory, and the like, and implements various functions for controlling the hydraulic pressure control circuit 7 by the processor executing a program stored in the memory or the like. The ESC-ECU 8 is communicably connected to the EPB-ECU 9 via an in-vehicle network such as a controller area network (CAN), for example.

Similarly to the ESC-ECU 8, the EPB-ECU 9 is also configured as a microcomputer including, for example, a processor, a memory, and the like, and implements various functions for controlling the EPB motors 10 by the processor executing the program stored in the memory or the like.

Here, in the embodiment, the EPB-ECU 9 can use various pieces of information for the control of the EPB motors 10. For example, the EPB-ECU 9 can use, for the control of the EPB motors 10, an output of a load sensor 23 that detects a load applied to the wheels (in particular, the drive wheels), an output of a wheel speed sensor 24 that detects a rotational speed of each wheel of the vehicle, and an output of a front-rear acceleration sensor 25 that detects an acceleration in a front-rear direction of the vehicle.

In the embodiment, provided are four wheel speed sensors 24 of a wheel speed sensor 24FL that detects a rotational speed of the front wheel FL, a wheel speed sensor 24FR that detects a rotational speed of the front wheel FR, a wheel speed sensor 24RL that detects a rotational speed of the rear wheel RL, and a wheel speed sensor 24RR that detects a rotational speed of the rear wheel RR.

In the embodiment, the EPB-ECU 9 can also use information acquired from a drive system ECU 30 that controls a drive source 31 such as an engine provided in the vehicle for the control of the EPB motors 10. The information acquired from the drive system ECU 30 is, for example, information related to a drive force generated by the drive source 31 under control of the drive system ECU 30. Similarly to the above ESC-ECU 8, the drive system ECU 30 is also communicably connected to the EPB-ECU 9 via the in-vehicle network or the like.

In the related art, a technique referred to as a drive away release (DAR) or the like is known in which, when a vehicle is stopped due to a parking brake force generated by the electric parking brake 2, the parking brake force is released in response to the acceleration operation for causing the vehicle to accelerate. In such a technique in the related art, on a premise that all the drive wheels of the vehicle are in contact with the ground, it is common to start the release of the parking brake force by using, as a trigger, the drive force generated by the drive source 31 in response to the acceleration operation exceeding a predetermined threshold value corresponding to a gradient of a road surface.

However, it is also assumed that the vehicle is stopped due to the parking brake force in a state where at least one wheel is not in contact with the ground on a predetermined road surface such as an uphill road having a large unevenness, for example. Here, when the lifted wheel that is not in contact with the ground is a drive wheel and the parking brake force is released by the general DAR described above, an actual drive force that compensates for a decrease in the parking brake force is not transmitted to a road surface, and an unintended behavior of the vehicle, such as sliding down on the uphill road, may occur.

Figure 3:
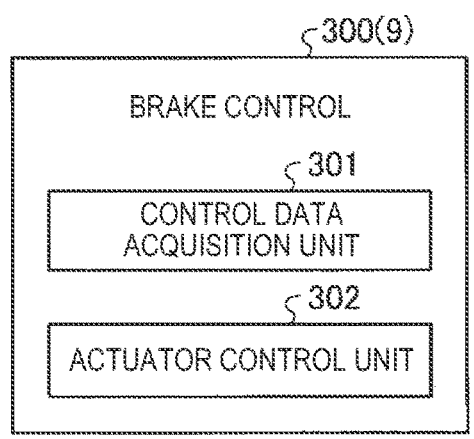
FIG. 3 is an exemplary and schematic block diagram illustrating functions of a brake control device according to the embodiment.

Therefore, the EPB-ECU 9 according to the embodiment executes a predetermined control program stored in the memory or the like by the processor to implement a brake control device 300 having functions as illustrated in FIG. 3 described later, thereby implementing prevention of the unintended behavior of the vehicle that may occur when the parking brake force is released in response to the acceleration operation.

FIG. 3 is an exemplary block diagram illustrating the functions of the brake control device 300 according to the embodiment. In the embodiment, some or all of the functions illustrated in FIG. 3 may be implemented by dedicated hardware (circuitry).

As illustrated in FIG. 3, the brake control device 300 according to the embodiment includes a control data acquisition unit 301 and an actuator control unit 302.

The control data acquisition unit 301 acquires the output of the load sensor 23 or the wheel speed sensor 24. The output of the load sensor 23 or the wheel speed sensor can be used for identifying a ground contact state indicating whether the drive wheels of the vehicle are in contact with the ground. In addition, the control data acquisition unit 301 acquires the output of the front-rear acceleration sensor 25, and acquires data indicating the drive force generated by the drive source 31 from the drive system ECU 30.

The actuator control unit 302 controls the electric parking brake 2 by controlling the EPB motors 10. For example, the actuator control unit 302 can rotate the EPB motors 10 in a normal direction, rotate the EPB motors 10 in a reverse direction, or stop the EPB motors 10 in order to control the parking brake force generated by the electric parking brake 2.

Here, in the embodiment, the actuator control unit 302 is configured to, when the acceleration operation for causing the vehicle to accelerate is performed on the vehicle stopped due to the parking brake force, identify the ground contact state of the drive wheels based on the output of the load sensor 23 or the wheel speed sensor 24 acquired by the control data acquisition unit 301.

For example, the actuator control unit 302 is configured to, when it is determined that there is a drive wheel with only a load less than the threshold value based on the output of the load sensor 23, or when it is determined that idling of a drive wheel occurs based on the output of the wheel speed sensor 24, identify that the drive wheel corresponds to the lifted wheel that is not in contact with the ground.

The actuator control unit 302 is configured to control the electric parking brake 2 to release the parking brake force by a control method that differs depending on the ground contact state identified by the above method.

More specifically, the actuator control unit 302 is configured to, when it is determined that all the drive wheels are grounded, start the release of the parking brake force by regarding, as the trigger, the drive force acquired by the control data acquisition unit 301 exceeding a threshold value corresponding to a gradient of a road surface set on the premise that all the drive wheels are in contact with the ground, similarly to the general DAR described above. The gradient of the road surface can be estimated based on the output of the front-rear acceleration sensor 25 acquired by the control data acquisition unit 301.

On the other hand, as described above, when at least one drive wheel corresponds to the lifted wheel that is not in contact with the ground and a timing of starting the release of the parking brake force is determined using the threshold value set on the premise that all the drive wheels are in contact with the ground, the unintended behavior of the vehicle may occur.

Therefore, the actuator control unit 302 is configured to, when it is identified that at least one drive wheel corresponds to the lifted wheel, correct a threshold value for determining the timing of starting the release of the parking brake force to be larger than the threshold value set on the premise that all the drive wheels are in contact with the ground.

For example, the actuator control unit 302 corrects the threshold value based on the following expression.

Threshold value=base×total drive force/(total drive force−drive force loss)

In the above expression, the base is a threshold value corresponding to the gradient of the road surface, which is set on the premise that all the drive wheels are in contact with the ground, similarly to the general DAR described above.

In addition, in the above expression, the total drive force is a value indicating a drive force generated by the drive source 31, and the drive force loss is a value indicating a loss of an actual drive force transmitted to a road surface generated due to a presence of the lifted wheel.

For example, it is assumed that the drive source generates a drive force of 20, and the drive force is equally distributed to left and right wheels. In this situation, when one wheel of a four-wheel drive vehicle (that is, a drive force per wheel is 5) is a lifted wheel, the threshold value is calculated by an expression of "base×20/(20−5)=base×4/3". When one wheel (drive wheel) of a two-wheel drive vehicle (that is, a drive force per wheel is 10) is a lifted wheel, the threshold value is calculated by an expression of "base×20/(20−10)=base× 2".

As described above, in the embodiment, the actuator control unit 302 corrects the threshold value according to an installation state of the drive wheels. Then, the actuator control unit 302 controls the electric parking brake 2 to start the release of the parking brake force at a timing at which the drive force generated by the drive source 31 in response to the acceleration operation exceeds a corrected threshold value. Accordingly, even in a situation where at least one drive wheel is not in contact with the ground, the release of the parking brake force can be started after an actual drive force sufficient to avoid the unintended behavior of the vehicle is ensured.

However, for example, in a vehicle having a limited split differential (LSD) function, when one of the left and right drive wheels corresponds to the lifted wheel that is not in contact with the ground and the parking brake force generated in the lifted wheel is released in response to the acceleration operation, a drive force is intensively transmitted only to the lifted wheel, and a drive force transmitted to the drive wheel in contact with the ground may be reduced.

Therefore, in the embodiment, the actuator control unit 302 is configured to, when the drive wheels include a lifted wheel that is not in contact with the ground, control the electric parking brake 2 to release only the parking brake force generated in a drive wheel other than the lifted wheel.

Further, in the embodiment, the actuator control unit 302 is configured to control the electric parking brake 2 to continuously generate the parking brake force on the lifted wheel until the lifted wheel is in contact with the ground even when the vehicle is started due to the release of the parking brake force with respect to the drive wheels other than the lifted wheel.

As described above, in the embodiment, the installation state of the drive wheels is identified based on the output of the load sensor 23 or the wheel speed sensor acquired by the control data acquisition unit 301. Therefore, when an abnormality occurs in only one of the load sensor 23 and the wheel speed sensor 24, a current installation state of the drive wheels can be identified based on the output of the other sensor, but when an abnormality occurs in both the load sensor 23 and the wheel speed sensor 24, the current installation state of the drive wheels is less likely to be identified.

Therefore, in the embodiment, the actuator control unit 302 can identify, when an abnormality occurs in the load sensor 23 and the wheel speed sensor 24, a current ground contact state of the drive wheels based on the output of the load sensor 23 or the wheel speed sensor 24 acquired by the control data acquisition unit 301 at a past (latest) timing that satisfies a condition that the vehicle is not started up to the present.

Figure 4:
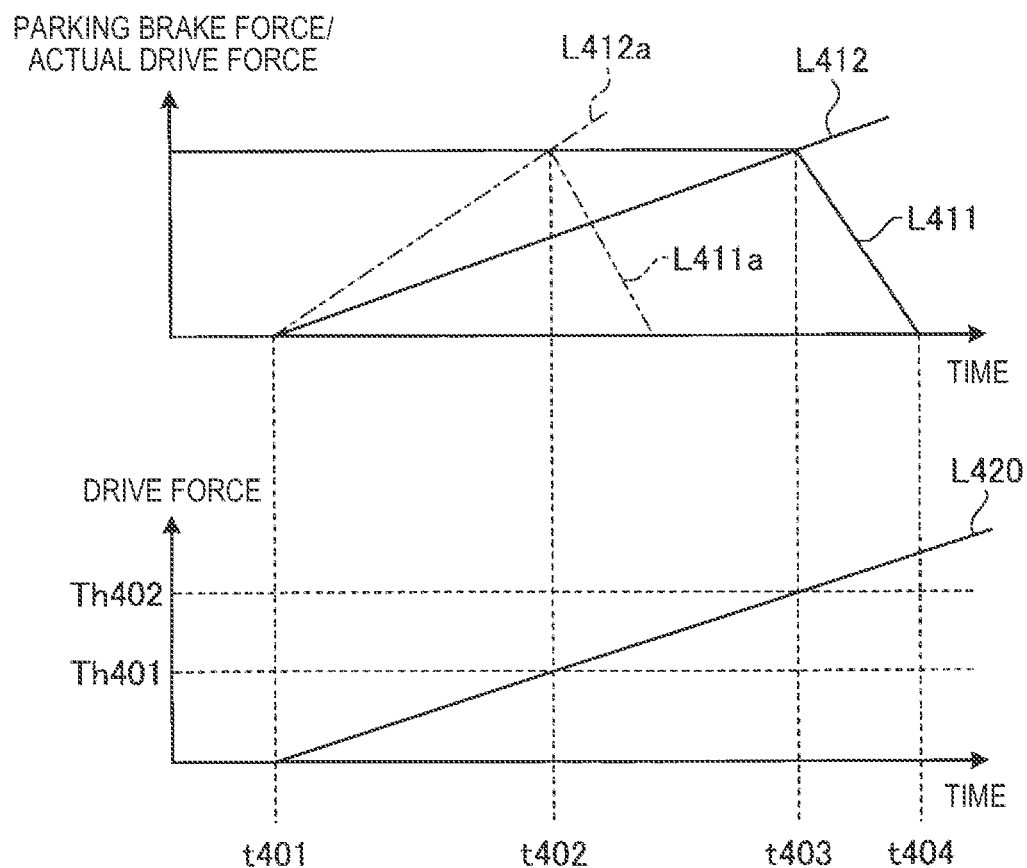
FIG. 4 is an exemplary timing chart for illustrating an example of release of a parking brake force in response to an acceleration operation executed in the embodiment.

Based on the above configuration, in the embodiment, as an example, the release of the parking brake force in response to the acceleration operation is executed along a timing chart as illustrated in FIG. 4 described later.

FIG. 4 is an exemplary timing chart illustrating an example of the release of the parking brake force in response to the acceleration operation executed in the embodiment. In the example illustrated in FIG. 4, it is assumed that the vehicle is stopped due to the parking brake force in the state where at least one drive wheel is not in contact with the ground on the predetermined road surface such as an uphill road having a large unevenness, for example.

In the example illustrated in FIG. 4, a solid line L411 indicates a temporal change in a parking brake force in the embodiment, and a two-dot chain line L411a indicates a temporal change in a parking brake force in a comparative example. The comparative example corresponds to an example in which the general DAR is executed in which the ground contact state of the drive wheels is not taken into consideration at all.

In the example illustrated in FIG. 4, a solid line L412 indicates a temporal change in an actual drive force in the embodiment, and an alternate long and short dash line L412a indicates a temporal change in an actual drive force in the comparative example. The actual drive force is a drive force that is actually transmitted from wheels to a road surface according to the drive force generated by the drive source 31.

In the example illustrated in FIG. 4, a solid line L420 indicates a temporal change in the drive force generated by the drive source 31. The temporal change indicated by the solid line L420 is assumed to be common in both the embodiment and the comparative example.

In the example illustrated in FIG. 4, the drive force generated by the drive source 31 starts to increase at a timing t401 in response to the acceleration operation performed on the vehicle stopped due to the parking brake force (see the solid line L420). The drive force generated by the drive source 31 reaches a predetermined threshold value Th401 at a timing t402 (see the solid line L420).

Here, the threshold value Th401 is a threshold value corresponding to the base described above, which is used as the trigger for starting the release of the parking brake force in the comparative example. Therefore, in the comparative example, at the timing t402 at which the drive force generated by the drive source 31 reaches the threshold value Th401, the release of the parking brake force is started (see the two-dot chain line L411a) on the premise that the drive force sufficient to avoid the unintended behavior of the vehicle is ensured since all the drive wheels are in contact with the ground (see the alternate long and short dash line L412a).

However, when at least one drive wheel is not in contact with the ground, an actual drive force sufficient to avoid the unintended behavior of the vehicle is not generated at the timing t402 (see the solid line L412). Therefore, in the embodiment, the threshold value used as the trigger for starting the release of the parking brake force is corrected to a threshold value Th402 larger than the threshold value Th401 by the method described above.

According to the above correction, at a timing t403 at which the drive force generated by the drive source 31 reaches the threshold value Th402, the drive force sufficient to avoid the unintended behavior of the vehicle is ensured (see the solid line L412). Therefore, in the embodiment, even when the release of the parking brake force is started at the timing t403 (see the solid line L411), the unintended behavior of the vehicle such as, for example, sliding down does not occur. When the timing t403 is exceeded, the vehicle starts to move. The release of the parking brake force is completed at a timing t404 (see the solid line L411).

Hereinafter, a series of processes executed by the brake control device 300 to implement the release of the parking brake force in response to the acceleration operation in the above form will be described more specifically.

Figure 5:
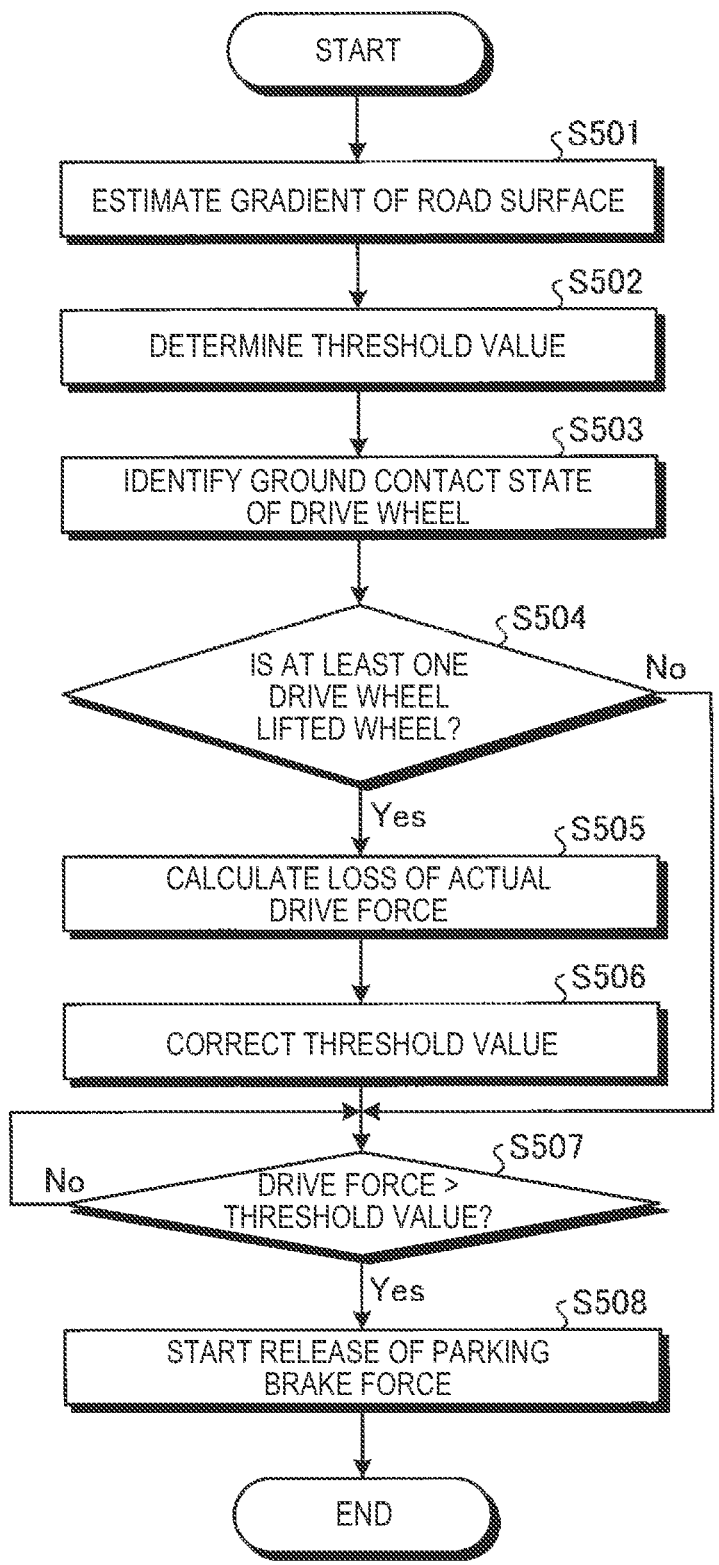
FIG. 5 is an exemplary flowchart illustrating a series of processes executed by the brake control device according to the embodiment in the release of the parking brake force in response to the acceleration operation.

FIG. 5 is an exemplary flowchart illustrating the series of processes executed by the brake control device 300 according to the embodiment in the release of the parking brake force in response to the acceleration operation. The series of processes illustrated in FIG. 5 starts when the acceleration operation is performed on the vehicle stopped due to the parking brake force.

As illustrated in FIG. 5, in the embodiment, first, the actuator control unit 302 of the brake control device 300 estimates a gradient of a road surface where the vehicle is currently stopped in step S501. The gradient of the road surface can be estimated based on the output of the front-rear acceleration sensor 25 acquired by the control data acquisition unit 301.

In step S502, the actuator control unit 302 of the brake control device 300 determines a threshold value to be compared with the drive force generated by the drive source 31 in order to determine the start of the release of the parking brake force. This threshold value is a threshold value corresponding to the base described above, which is determined according to the gradient of the road surface on the premise that all the drive wheels are in contact with the ground.

In step S503, the actuator control unit 302 of the brake control device 300 identifies a ground contact state of the drive wheels. The ground contact state can be identified based on the output of the load sensor 23 or the wheel speed sensor 24 acquired by the control data acquisition unit 301.

In step S504, the actuator control unit 302 of the brake control device 300 determines, based on the ground contact state identified in step S503 described above, whether at least one drive wheel corresponds to a lifted wheel that is not in contact with the ground.

In step S504, when it is determined that at least one drive wheel corresponds to the lifted wheel, the process proceeds to step S505.

In step S505, the actuator control unit 302 of the brake control device 300 calculates a loss of an actual drive force transmitted from the drive wheels to the road surface. The loss of the actual drive force corresponds to the drive force loss described above.

In step S506, the actuator control unit 302 of the brake control device 300 corrects, based on the loss of the actual drive force calculated in step S505 described above, the threshold value determined in step S502 described above. Since a specific method of the correction has already been described using the expression, the description thereof is omitted here.

When the process of step S506 is completed, the process proceeds to step S507. When it is determined in step S504 described above that all the drive wheels are in contact with the ground, the process proceeds to step S507 (in this case, the processes of steps S505 and S506 are skipped).

In step S507, the actuator control unit 302 of the brake control device 300 determines whether the drive force generated by the drive source 31 exceeds the threshold value determined in step S502 described above or the threshold value subjected to the correction in step S506 described above. The drive force generated by the drive source 31 can be acquired from the drive system ECU 30 via the control data acquisition unit 301.

A determination process in step S507 is repeatedly executed until it is determined that the drive force exceeds the threshold value. When it is determined in step S507 that the drive force exceeds the threshold value, the process proceeds to step S508.

In step S508, the actuator control unit 302 of the brake control device 300 starts the release of the parking brake force. Accordingly, the release of the parking brake force can be started in response to ensuring the drive force sufficient to avoid the unintended behavior of the vehicle. Then, the process ends.

As described above, the brake control device 300 according to the embodiment includes the control data acquisition unit 301 and the actuator control unit 302. The control data acquisition unit 301 acquires the output of the load sensor 23 or the wheel speed sensor 24 as a sensor that detects the information indicating the ground contact state of the drive wheels of the vehicle. The actuator control unit 302 identifies, when the acceleration operation for causing the vehicle to accelerate is performed on the vehicle stopped due to the parking brake force generated by the electric parking brake 2, the ground contact state of the drive wheels based on the output of the load sensor 23 or the wheel speed sensor 24 acquired by the control data acquisition unit 301, and controls the electric parking brake 2 to release the parking brake force by different control methods according to the identified ground contact state.

According to the above configuration, when the parking brake force is released in response to the acceleration operation, the ground contact state of the drive wheels is taken into consideration. Therefore, it is possible to prevent the unintended behavior of the vehicle that may occur when the parking brake force is released in response to the acceleration operation.

In the embodiment, the above control is implemented not by the regular brake 1 but by the electric parking brake 2. In order to implement control similar to the above control by the regular brake 1, it is necessary to constantly operate the pump of the regular brake 1, so that the control is inconvenient in terms of fuel efficiency or a life of a motor for driving the pump. In contrast, in the embodiment, the above control can be implemented without inconvenience by simple control of only rotating the EPB motors 10 of the electric parking brake 2 in the reverse direction.

Here, in the embodiment, the actuator control unit 302 controls, when the drive force generated by the drive source of the vehicle in response to the acceleration operation reaches the threshold value determined according to the ground contact state of the drive wheels, the electric parking brake 2 to start the release of the parking brake force. According to such a configuration, the timing at which the release of the parking brake force is started can be appropriately adjusted to prevent the unintended behavior of the vehicle by using the threshold value determined according to the ground contact state of the drive wheels.

Further, in the embodiment, the actuator control unit 302 can control, when the drive wheels include the lifted wheel that is not in contact with the ground, the electric parking brake 2 to release the parking brake force generated on drive wheels other than the lifted wheel while continuously generating the parking brake force on the lifted wheel. According to such a configuration, for example, in the vehicle having the LSD function, the drive force can be prevented from being intensively transmitted to only the lifted wheel, and the drive force can be reliably transmitted to the drive wheels that are in contact with the ground.

Further, in the embodiment, the actuator control unit 302 can control the electric parking brake 2 to continuously generate the parking brake force on the lifted wheel until the lifted wheel is in contact with the ground even when the vehicle is started. According to such a configuration, even when the vehicle is started, the drive force can be reliably transmitted to the drive wheels that are in contact with the ground.

In the embodiment, the actuator control unit 302 identifies, when an abnormality occurs in both the load sensor 23 and the wheel speed sensor 24, the current ground contact state of the drive wheels based on the output of the load sensor 23 or the wheel speed sensor 24 acquired by the acquisition unit at the past timing that satisfies the condition that the vehicle is not started up to the present. According to such a configuration, even when an abnormality occurs in both the load sensor 23 and the wheel speed sensor 24, it is possible to prevent, by using past data, the unintended behavior of the vehicle that may occur when the parking brake force is released in response to the acceleration operation.

Modification

Although the electric parking brake 2 according to the embodiment described above is an electric parking brake corresponding to a disc brake, this case is merely an example. The technique of the present disclosure can also be applied to an electric parking brake corresponding to another brake other than the disc brake, such as a drum brake, for example.

Figure 6:
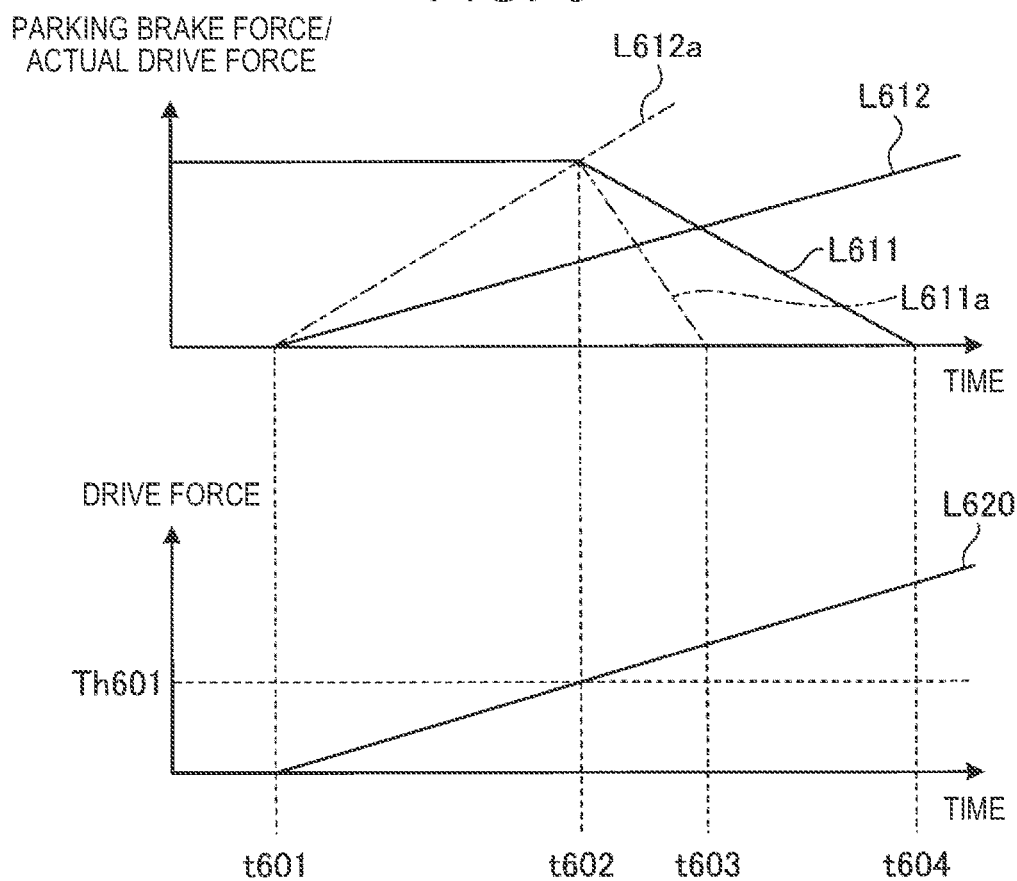
FIG. 6 is an exemplary timing chart for illustrating the release of the parking brake force according to the acceleration operation that can be executed in a modification of the embodiment.

Further, in the embodiment described above, a configuration is exemplified in which a desired effect is obtained by correcting, according to the installation state of the drive wheels, the threshold value to be compared with the drive force generated by the drive source 31. However, as a modification, as illustrated in FIG. 6 described later, a configuration is also conceivable in which the desired effect is obtained by changing the gradient in the release of the parking brake force according to the ground contact state of the drive wheels. In the following description, the same components as those of the embodiment described above are denoted by the same reference numerals, and the description thereof is omitted.

FIG. 6 is an exemplary timing chart for illustrating release of a parking brake force in response to an acceleration operation that can be executed in the modification of the embodiment. Similarly to the example illustrated in FIG. 4 described above, in the example illustrated in FIG. 6, it is assumed that the vehicle is stopped due to the parking brake force in a state where at least one drive wheel is not in contact with the ground on a predetermined road surface such as an uphill road having a large unevenness, for example.

In the example illustrated in FIG. 6, a solid line L611 indicates a temporal change in a parking brake force in the modification, and a two-dot chain line L611a indicates a temporal change in a parking brake force in a comparative example. The comparative example corresponds to the example in which the general DAR is executed in which the ground contact state of the drive wheels is not taken into consideration at all, similarly to the comparative example illustrated for the description of the embodiment described above.

In the example illustrated in FIG. 6, a solid line L612 indicates a temporal change in an actual drive force in the embodiment, and an alternate long and short dash line L612a indicates a temporal change in an actual drive force in the comparative example. The actual drive force is a drive force that is actually transmitted from the wheels to the road surface according to a drive force generated by the drive source 31.

In the example illustrated in FIG. 6, a solid line L620 indicates a temporal change in the drive force generated by the drive source 31. The temporal change indicated by the solid line L620 is assumed to be common in both the embodiment and the comparative example.

In the example illustrated in FIG. 6, the drive force generated by the drive source 31 starts to increase at a timing t601 in response to the acceleration operation performed on the vehicle stopped due to the parking brake force (see the solid line L620). The drive force generated by the drive source 31 reaches a predetermined threshold value Th601 at a timing t602 (see the solid line L620).

Here, the threshold value Th601 is a threshold value corresponding to the base described above, which is used as the trigger for starting the release of the parking brake force in the comparative example. Therefore, in the comparative example, at the timing t602 at which the drive force generated by the drive source 31 reaches the threshold value Th601, the release of the parking brake force is started (see the two-dot chain line L611a) on the premise that the drive force sufficient to avoid the unintended behavior of the vehicle is ensured since all the drive wheels are in contact with the ground (see the alternate long and short dash line L612a). In the comparative example, the release of the parking brake force is completed at a timing t603 (see the two-dot chain line L611a).

Here, in the modification, a gradient in the release of the parking brake force is gentler than that in the comparative example without changing the threshold value itself used as the trigger for starting the release of the parking brake force, so that the prevention of the unintended behavior of the vehicle can be implemented. That is, in the modification, the release of the parking brake force is started at the timing t602 as in the comparative example, but the gradient in the release of the parking brake force is adjusted such that the release of the parking brake force is completed at a timing t604 later than the timing t603 at which the release of the parking brake force is completed in the comparative example (see the solid line L611).

According to the adjustment described above, as compared with the comparative example, a state where the parking brake force remains is continued for a longer period of time, and therefore, the unintended behavior of the vehicle can be prevented.

As described above, in the modification illustrated in FIG. 6, the gradient in the release of the parking brake force is adjusted according to the ground contact state of the drive wheels. According to such a configuration, the parking brake force can be released at a gradient corresponding to the ground contact state of the drive wheels to prevent the unintended behavior of the vehicle, such as releasing the parking brake force more gently in a case where at least one drive wheel is not in contact with the ground than in a case where all the drive wheels are in contact with the ground.

The technique of the present disclosure also includes a technique of obtaining the desired effect by performing both the correction of the threshold value according to the embodiment described above and the adjustment of the gradient according to the modification described above.

While embodiments and modifications of the present disclosure have been described, these embodiments and modifications have been presented by way of example only, and are not intended to limit the scope of the disclosure. Indeed, the novel embodiments and modifications described above may be embodied in a variety of forms, and various omissions, substitutions, and modifications may be made without departing from the spirit of the disclosure. The accompanying claims and their equivalents are intended to cover such forms or modifications as would fall within the scope and spirit of the disclosures.

The invention claimed is:

1. A brake control device, comprising:
an acquisition unit configured to acquire an output of a sensor that detects information indicating a ground contact state of a drive wheel of a plurality of drive wheels of a vehicle; and
a control unit configured to, when an acceleration operation for causing the vehicle to accelerate is performed on the vehicle stopped due to a parking brake force generated by an electric parking brake, identify the ground contact state of the drive wheel based on the output of the sensor acquired by the acquisition unit, and control the electric parking brake to release the parking brake force by a control method that differs depending on the identified ground contact state, wherein
the control unit adjusts, according to the ground contact state of the drive wheel, a temporal change in the parking brake force when releasing the parking brake force, so that the temporal change in the parking brake force is more gradual than in a case where the ground contact state of the drive wheel is not taken into consideration.

2. The brake control device according claim 1, wherein
the control unit controls, when the plurality of the drive wheels include a lifted wheel that is not in contact with the ground, and a wheel that is in contact with the ground, the electric parking brake to release a parking brake force applied to the wheel that is in contact with the ground while continuously applying a parking brake force to the lifted wheel.

3. The brake control device according to claim 2, wherein
the control unit controls the electric parking brake to continuously apply the parking brake force to the lifted wheel until the lifted wheel is in contact with the ground even when the vehicle is started.

4. The brake control device according claim 3, wherein
the control unit identifies, when an abnormality occurs in the sensor, a ground contact state of the drive wheel when the abnormality occurs based on an output of the sensor acquired by the acquisition unit before the abnormality in which the vehicle is not started occurs.

5. A brake control device, comprising:
an acquisition unit configured to acquire an output of a sensor that detects information indicating a ground contact state of a drive wheel of a plurality of drive wheels of a vehicle; and
a control unit configured to, when an acceleration operation for causing the vehicle to accelerate is performed on the vehicle stopped due to a parking brake force generated by an electric parking brake, identify the ground contact state of the drive wheel based on the output of the sensor acquired by the acquisition unit, and control the electric parking brake to release the parking brake force by a control method that differs depending on the identified ground contact state, wherein
the control unit controls, when the plurality of the drive wheels include a lifted wheel that is not in contact with the ground, and a wheel that is in contact with the ground, the electric parking brake to release a parking brake force applied to the wheel that is in contact with the ground while continuously applying a parking brake force to the lifted wheel.

6. The brake control device according to claim 5, wherein
the control unit controls the electric parking brake to continuously apply the parking brake force to the lifted wheel until the lifted wheel is in contact with the ground even when the vehicle is started.

7. The brake control device according to claim 6, wherein
the control unit identifies, when an abnormality occurs in the sensor, a ground contact state of the drive wheel when the abnormality occurs based on an output of the sensor acquired by the acquisition unit before the abnormality in which the vehicle is not started occurs.

8. A brake control device, comprising:
an acquisition unit configured to acquire an output of a sensor that detects information indicating a ground contact state of a drive wheel of a plurality of drive wheels of a vehicle; and
a control unit configured to, when an acceleration operation for causing the vehicle to accelerate is performed on the vehicle stopped due to a parking brake force generated by an electric parking brake, identify the ground contact state of the drive wheel based on the output of the sensor acquired by the acquisition unit, and control the electric parking brake to release the parking brake force by a control method that differs depending on the identified ground contact state, wherein the control unit identifies, when an abnormality occurs in the sensor, a ground contact state of the drive wheel when the abnormality occurs based on an output of the sensor acquired by the acquisition unit before the abnormality in which the vehicle is not started occurs.

* * * * *